United States Patent Office 2,753,359
Patented July 3, 1956

2,753,359

NAPHTHIOFLUORENE CARBOXYLIC ACIDS

Robert H. Mazur, Evanston, Ill., assignor, by mesne assignments, to G. D. Searle & Co., Skokie, Ill., a corporation of Delaware No Drawing. Application February 7, 1955,
Serial No. 486,708

5 Claims. (Cl. 260—397.1)

This invention relates to oxygenated polyhydrodimethylnaphthofluorene dicarboxylic acids and esters, and processes for the manufacture thereof. More particularly this invention relates to 11H-naphtho[2,1-a]fluorenes of the formula

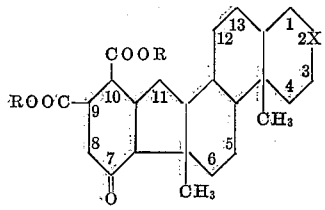

wherein R is H or a lower alkyl radical, X is a carbonyl (>CO) or hydroxymethylene (>CHOH) radical, and there is a double bond between carbons 13 and 13a, or 13a and 1. Among the lower alkyl radicals comprehended by R in the generic formula above are methyl, ethyl, propyl, isopropyl, isobutyl, secondary butyl, tertiary butyl, amyl, secondary normal amyl, primary isoamyl, secondary isoamyl, tertiary amyl, and like $C_sH_{2s+1}$ radicals wherein $s$ is a positive integer amounting to less than 7.

The subject compounds are derived from the maleic anhydride adduct of a 3-acetoxy-17-(α-acetoxyvinyl)-1,2,3,4,7,8,9,10,11,12,13,14-dodecahydro - 10,13 - dimethyl-15H-cyclopenta[a]phenanthrene. Cleavage of the anhydro ring therein under alkaline conditions provides the hydroxy dicarboxylic acids of this invention, which in turn are appropriately esterified by known techniques to produce the corresponding alkoxycarbonyl compounds hereinafter claimed. Oppenauer oxidation of these hydroxy esters yields the dioxo esters of my discovery, and these esters are converted to the claimed dioxo acids by saponification.

The compounds to which this invention relates are valuable because of their physiological activity. Whereas the steroid adducts which serve as starting materials for the instant preparations are characterized by strongly anti-hypertensive properties, the compositions which proceed therefrom as here disclosed—the substances defined by the claims of the present application—are, surprisingly, possessed of potent pressor activity.

The instant compounds are relatively insoluble in water but may be dissolved in alcohol and other common organic solvents. The subject compounds may be administered in solid form as tablets or capsules; dissolved or suspended in aqueous media, they may be given parenterally.

The following examples will illustrate in detail certain of the acids and esters which constitute the present invention, and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. Specific rotations refer to the D line of sodium and were determined in methyl alcohol solution at room temperatures.

Example 1

A. 2,7 - diacetoxy-1,2,3,4,4a,4b,5,6,6a,8,9,10,10a,11a,- 11b,12 - hexadecahydro - 4a,6a-dimethyl - 11H -naphtho- [2,1-a]fluorene-9,10-dicarboxylic acid anhydride.—A solution of 39 parts of 3,20-diacetoxypregna-5,16,20-triene—preparable by the method of Moffett and Weisblat, J. Amer. Chem. Soc., 74, 2183 (1952)—and 40 parts of maleic anhydride in 700 parts of benzene is heated at 90–100° C. for 1 hour and then allowed to stand at room temperatures overnight. The solution is diluted with 560 parts of ether, washed twice with water, and then dried over anhydrous sodium sulfate. Solvent is stripped by vacuum distillation, following which the residue is taken up in 160 parts of benzene and the resultant solution diluted with 465 parts of boiling cyclohexane. On cooling, 2,7-diacetoxy-1,2,3,4,4a,4b,5,6,6a,- 8,9,10,10a,11a,11b,12 - hexadecahydro - 4a,6a - dimethyl- 11H-naphtho[2,1-a]fluorene-9,10-dicarboxylic acid anhydride is precipitated as tiny needles, M. P. 241–243° C. The product has the formula

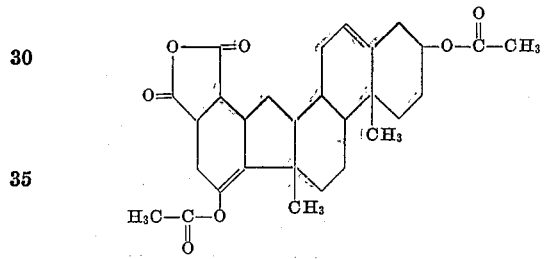

B. 1,2,3,4,4a,4b,5,6,6a,6b,7,8,9,10,10a,11a,11b,12 - octadecahydro - 2-hydroxy-4a,6a-dimethyl-7-oxo-11H-naphtho[2,1-a]fluorene-9,10-dicarboxylic acid.—A suspension of 2 parts of the anhydride of the preceding Part A of this example in 50 parts of 1N aqueous potassium hydroxide is heated at 90–100° C. for 1 hour. Solution occurs in process. The hot reaction mixture is brought to a pH of approximately 1 with 2N hydrochloric acid, then chilled. The precipitate which forms is removed by filtration and recrystallized from aqueous methyl alcohol to give 1,2,3,4,4a,4b,5,6,6a,6b,7,8,9,10,10a,11a,11b,12 - octadecahydro - 2 - hydroxy-4a,6a-dimethyl-7-oxo-11H-naphtho[2,1-a]fluorene-9,10-dicarboxylic acid as fine needles, M. P. 315–320° C. (with decomposition), specific rotation +5°. The product has the formula

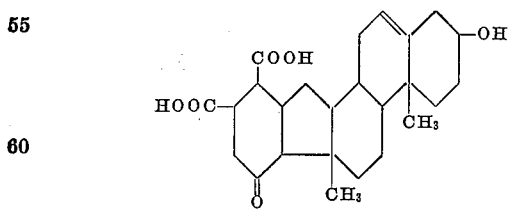

Example 2

1,2,3,4,4a,4b,5,6,6a,6b,7,8,9,10,10a,11a,11b,12 - octadecahydro - 9,10 - dimethoxycarbonyl-2-hydroxy-4a,6a-dimethyl-11H-naphtho[2,1-a]fluorene-7-one.—The acid of Example 1 is esterified with an excess of diazomethane in ether. Solvent is stripped by vacuum distillation and the residue crystallized from a mixture of benzene and cyclohexane as large prisms, M. P. 188.5–194.5° C., specific rotation 0°. The product, 1,2,3,4,4a,4b,5,6,6a,6b,7,8,9, 10,10a,11a,11b,12 - octadecahydro - 9,10-dimethoxy-carbonyl-2-hydroxy-4a,6a-dimethyl-11H-naphtho[2,1-a]fluorene-7-one, has the formula

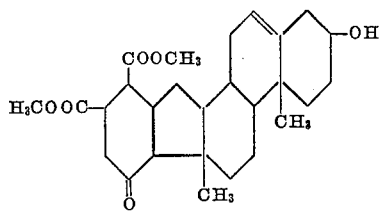

*Example 3*

*2,3,4,4a,4b,5,6,6a,6b,7,8,9,10,10a,11a,11b,12,13 - octadecahydro - 9,10-dimethoxycarbonyl-4a,6a-dimethyl-11H-naphtho[2,1-a]fluorene-2,7-dione.*—Oppenauer oxidation of 5 parts of the ester of Example 2, dissolved in a mixture of 70 parts of toluene and 38 parts of cyclohexanone, with a solution of 8 parts of aluminum isopropoxide in 35 parts of toluene, by heating at reflux temperatures for 2 hours and subsequently steam distilling in the presence of 100 parts of 50% aqueous Rochelle salt solution provides the desired α,β-unsaturated ketone as a precipitate (in the distilland) which, twice crystallized from a mixture of benzene and cyclohexane, comes down as tiny needles M. P. 233–236° C., specific rotation +87°. The 2,3,4,4a,4b,5,6,6a,6b,7,8,9,10,10a,11a,11b,12,13 - octadecahydro-9,10 - dimethoxycarbonyl - 4a,6a-dimethyl-11H-naphtho[2,1-a]fluorene-2,7-dione thus obtained has the formula

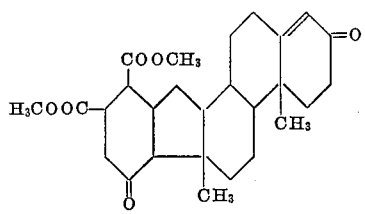

*Example 4*

*2,3,4,4a,4b,5,6,6a,6b,7,8,9,10,10a,11a,11b,12,13 - octadecahydro-4a,6a-dimethyl-2,7-dioxo-11H-naphtho[2,1-a]-fluorene-9,10-dicarboxylic acid.*—Saponification of the ester of Example 3 according to the technique detailed in Example 1B affords pure 2,3,4,4a,4b,5,6,6a,6b,7,8,9,10,10a,11a,11b,12,13 - octadecahydro-4a,6a-dimethyl-2,7-dioxo - 11H-naphtho[2,1-a]fluorene-9,10-dicarboxylic acid having the formula

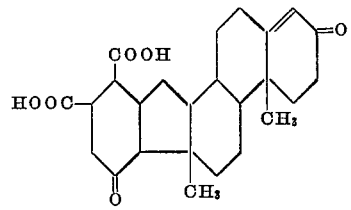

What is claimed is:
1. A compound of the formula

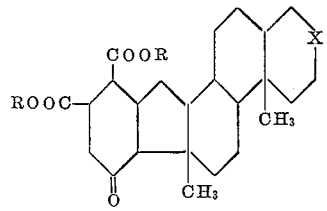

wherein R is selected from the group consisting of hydrogen and methyl radicals, X is selected from the group consisting of carbonyl and hydroxymethylene radicals, and the carbon atom at 13a is doubly bonded to a carbon selected from the group consisting of the $C_1$ and $C_{13}$ atoms.

2. 1,2,3,4,4a,4b,5,6,6a,6b,7,8,9,10,10a,11a,11b,12 - octadecahydro - 2-hydroxy-4a,6a-dimethyl-7-oxo-11H-naphtho[2,1-a]fluorene-9,10-dicarboxylic acid.

3. 2,3,4,4a,4b,5,6,6a,6b,7,8,9,10,10a,11a,11b,12,13 - octadecahydro-4a,6a-dimethyl - 2,7 - dioxo - 11H - naphtho[2,1-a]fluorene-9,10-dicarboxylic acid.

4. 1,2,3,4,4a,4b,5,6,6a,6b,7,8,9,10,10a,11a,11b,12 - octadecahydro - 9,10 - dimethoxycarbonyl-2-hydroxy-4a,6a-dimethyl-11H-naphtho[2,1-a]fluorene-7-one.

5. 2,3,4,4a,4b,5,6,6a,6b,7,8,9,10,10a,11a,11b,12,13 - octadecahydro - 9,10 - dimethoxycarbonyl - 4a,6a-dimethyl-11H-naphtho[2,1-a]fluorene-2,7-dione.

No references cited.